United States Patent [19]

Moriya et al.

[11] Patent Number: 5,821,315
[45] Date of Patent: Oct. 13, 1998

[54] THERMOSET COVERING COMPOSITIONS

[75] Inventors: Joichi Moriya; Fumi Maruyama; Kishio Shibato, all of Yokohama, Japan; Peter Betz, Müster, Germany

[73] Assignee: BASF Lacke & Farben, AG, Muenster-Hiltrup, Germany

[21] Appl. No.: 682,521

[22] PCT Filed: Jan. 18, 1995

[86] PCT No.: PCT/EP95/00172

§ 371 Date: Jul. 24, 1996

§ 102(e) Date: Jul. 24, 1996

[87] PCT Pub. No.: WO95/20003

PCT Pub. Date: Jul. 27, 1995

[30] Foreign Application Priority Data

Jan. 24, 1994 [JP] Japan ..................................... 6-005937

[51] Int. Cl.$^6$ .................................................. C08G 18/80
[52] U.S. Cl. ............................. 528/45; 525/124; 525/131
[58] Field of Search ................ 528/45; 525/131, 525/124

[56] References Cited

U.S. PATENT DOCUMENTS

| | | | |
|---|---|---|---|
| 3,892,714 | 7/1975 | Sampson et al. | 260/77.5 CR |
| 4,340,511 | 7/1982 | Backhouse et al. | 524/504 |
| 4,808,656 | 2/1989 | Kania et al. | 524/558 |
| 4,845,147 | 7/1989 | Blum et al. | 524/461 |
| 4,879,337 | 11/1989 | Shibato et al. | 524/504 |
| 5,093,390 | 3/1992 | Shibato et al. | 524/558 |
| 5,093,408 | 3/1992 | Jung et al. | 524/558 |
| 5,342,878 | 8/1994 | Das et al. | 524/558 |
| 5,346,958 | 9/1994 | Yukawa et al. | 525/328.8 |
| 5,516,559 | 5/1996 | Röckrath et al. | 427/388.2 |
| 5,523,164 | 6/1996 | Shibato et al. | 428/461 |

FOREIGN PATENT DOCUMENTS

| | | | |
|---|---|---|---|
| 382 454 | 8/1910 | European Pat. Off. . | |
| 0 044 393 A2 | 6/1981 | European Pat. Off. | C08F 220/28 |
| 0 285 973 A3 | 3/1988 | European Pat. Off. | C08F 291/00 |
| WO90/15090 | 12/1990 | European Pat. Off. | C08G 18/80 |
| 0 531 058 A3 | 8/1992 | European Pat. Off. | C09D 167/00 |
| 0 576 039 A3 | 4/1993 | European Pat. Off. | C09D 125/14 |
| WO 93/15849 | 8/1993 | European Pat. Off. | B05D 5/06 |
| WO94/09916 | 5/1994 | European Pat. Off. | B05D 7/26 |
| 1.570.799 | 6/1969 | France . | |
| 2 025 992 | 6/1979 | United Kingdom | C08F 2/14 |
| WO-A-9217543 | 10/1992 | WIPO . | |
| WO-A-9218255 | 10/1992 | WIPO . | |

*Primary Examiner*—Rachel Gorr

[57] ABSTRACT

Provided are compositions useful as paints which have excellent acid resistance and scratching resistance, and provide a good appearance. The thermoset compositions are comprised of a vinyl copolymer (A) comprised of lactone modified acrylic monomer and other monomer, a blocked polyisocyanate compound (B) which has been reacted with a mixture of malonic acid and acetoacetic acid, and an alkyl etherified amino resin (C).

6 Claims, No Drawings

THERMOSET COVERING COMPOSITIONS

INDUSTRIAL FIELD OF APPLICATION

This invention concerns thermoset covering compositions and, more precisely, it concerns thermoset covering compositions which are ideal for clear coat paints for top-coat painting for forming paint films on automobiles, for example, which, in particular, have excellent acid resistance and scratching resistance.

PRIOR ART

In recent years, two-coat one-bake systems in which a base coat paint in which a coloring agent, such as a colored pigment or a metallic pigment for example, has been compounded and a clear coat paint which does not contain a coloring agent, or which contains only a trace amount of coloring agent, are painted over each other using a wet on wet system, and both paints are heated and hardened at the same time, have generally been adopted for top-coat painting on the outer panels of automobiles, and a paint film with a very high sense of gloss and a high degree of smoothness is obtained in this way.

However, paints films which have such an excellent appearance, with the preference of darker colors in recent years, reveal water spotting due to acid rain which has now become a problem for society and scratching which is produced when car washing, and there is a strong demand for these problems to be resolved.

The use of hydroxy group containing acrylic based copolymers, blocked polyisocyanate compound and alkyl etherified amino resins to improve thermoset resin compositions with which paint films which have excellent acid resistance and scratch resistance can be obtained have been disclosed in Japanese Patent Kokai H2-242867 and Japanese Patent Kokai H3-172368 as means of improving upon these points.

However, with such resin compositions, there is no invention in the vinyl based copolymer and blocked polyisocyanate compound and so the scratching resistance is inadequate.

Furthermore, thermoset resin compositions with which paint films which have excellent scratching resistance are obtained by combining polyisocyanate compounds and acrylic based copolymers which have soft segments have been disclosed in Japanese Patent Kokai H2-305873.

However, these resin compositions are comprised of just the abovementioned acrylic based copolymers and polyisocyanate compounds and so in those cases where the base coat paint is an alkyl etherified amino resin thermoset type paint the appearance of the paint film with two-coat one-bake painting is inadequate.

Moreover, thermoset resin compositions with which paint films which have excellent scratching resistance and excellent staining resistance are obtained by combining vinyl based copolymers which have soft segments, alkyl etherified amino resins and blocked polyisocyanate compounds have been disclosed in Japanese Patent Kokai H1-158079.

However, with these resins again, acetoacetic acid ester alone, for example, is used for the blocking agent of the blocked polyisocyanate compound and so yellowing on baking and compatibility cannot be balanced.

PROBLEMS TO BE RESOLVED BY THE INVENTION

The aim of this present invention is to resolve the problems of the past as indicated above and so provide thermoset covering compositions with which paint films which have excellent acid resistance and scratching resistance are obtained, with which paint films with a satisfactory appearance can be obtained using two-coat one-bake painting, and with which failure of the appearance of the paint film due to yellowing at the time of baking or compatibility can be prevented.

MEANS OF RESOLVING THESE PROBLEMS

As a result of thorough research carried out with a view to developing paint compositions for top coat clear coat purposes which form paint films which have none of the abovementioned problems, which have excellent paint film physical and chemical performance, and which have excellent scratching resistance and acid resistance without loss of brilliance, smoothness or yellowing resistance for example, with two-coat one-bake systems, the inventors have discovered that the abovementioned aims can be realized with thermoset covering compositions in which a specified vinyl based copolymer, polyisocyanate compound which has been blocked with specified active methylene groups, and alkyl etherified amino resin form the essential components, and the invention is based upon this discovery.

That is to say, the present invention provides the following thermoset covering compositions:

(1) Thermoset covering composition, characterized in that it contains:

(A) 40–80 percent by weight of a vinyl based copolymer in which the structural units represented by general formula [1] account for 5–60 percent by weight of the vinyl based copolymer, and which has a hydroxy group value of 60–200 mg KOH/gram, (B) 10–40 percent by weight of blocked polyisocyanate compound for which a polyisocyanate compound has been reacted with malonic acid ester and acetoacetic acid ester, and (C) 5–30 percent by weight of alkyl etherified amino resin.

General Formula [1]

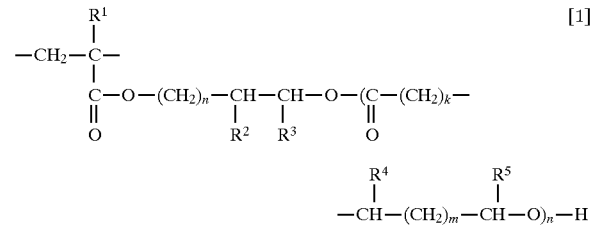

(In this formula, $R^1$, $R^2$, $R^3$ and $R^4$ represent hydrogen atoms or methyl groups, $R^5$ represents a hydrogen atom or alkyl group of carbon number 1–3, h is an integer of value 0–2, k is an integer of value 0–3, m is an integer of value 0–3 and n is an integer of value 1–5, and the sum of k and m is not more than 3.)

(2) Thermoset covering composition as in (1) above wherein the vinyl based copolymer (A) has a weight average molecular weight of 4000–40000, a glass transition temperature of −30°−+60° C., and an acid value of 0–40 mg KOH/gram.

(3) Thermoset covering composition as in (1) or (2) above wherein, in the blocked polyisocyanate compound (B), 5–95 mol. % of malonic acid ester and 95-5 mol. % of acetoacetic acid ester are reacted with the polyisocyanate compound.

(4) Thermoset covering composition as in (1), (2) or (3) above wherein, in the blocked polyisocyanate compound (B), the polyisocyanate compound which is reacted with the malonic acid ester and acetoacetic acid ester is aliphatic and/or alicyclic polyisocyanate compound.

(5) Thermoset covering composition and in (1), (2), (3) or (4) above wherein the alkyl etherified amino resin (C) is a melamine resin which has been etherified with alkyl groups of carbon number 1–6.

The vinyl based copolymer which is used as the (A) component in a thermoset covering composition of this present invention is a vinyl based copolymer which contains 5–60 percent by weight of structural units which can be represented by the aforementioned general formula [1], and it contains 40–95 percent by weight of structural units originating from other monomers, and it has a hydroxy group value of 60–200 mg KOH/gram. Such a vinyl based copolymer (A) can be obtained, for example, by the copolymerization (with two components or more than two components) of lactone modified acrylic monomers for which lactone has been added to a hydroxy group containing acrylic monomer, and other monomers which can be polymerized along with these monomers.

Examples of hydroxy group containing acrylic monomers include 2-hydroxyethyl (meth)acrylate, hydroxypropyl (meth)acrylate and hydroxybutyl (meth)acrylate, and examples of lactones include ε-caprolactone, β-methyl-δ-valerolactone, γ-valerolactone, δ-valerolactone, δ-caprolactone, γ-caprolactone, β-propiolactone and γ-butyrolactone The lactone modified acrylic monomer can be manufactured by adding 1–5 mol of lactone to 1 mol of the abovementioned hydroxy group containing acrylic monomer. If, in this case, more than 5 mol of lactone are added, solvent resistance after paint film formation becomes poor and this is undesirable. The method of addition in which ε-caprolactone is reacted in the presence of a catalyst with the hydroxy group containing acrylic monomer, as shown for example in Japanese Patent Kokai 63-118317, or other known methods, can be adopted.

Furthermore, commercial products such as, for example, Burakuseru (trade name) made by the Daiseru Kagaku Kogyo (Co.), and TONE (trade name) made by the Union Carbide Co. can be used for the lactone modified acrylic monomer.

On the other hand, $C_1$–$C_{18}$ alkyl or cycloalkyl esters of (meth)acrylic acid, such as methyl (meth)acrylate, ethyl (meth)acrylate, propyl (meth)acrylate, n-butyl (meth)acrylate, 1-butyl (meth)acrylate, t-butyl (meth)acrylate, 2-ethylhexyl (meth)acrylate, cyclohexyl (meth)acrylate, n-octyl (meth)acrylate, lauryl (meth)acrylate, dodecyl (meth)acrylate, stearyl (meth)acrylate and cyclohexyl (meth)acrylate, styrene and styrene derivatives, and vinyl based monomers such as acrylonitrile, acrylamide, vinyltoluene, vinyl acetate, glycidyl methacrylate, acrylic acid and methacrylic acid, can be cited as other monomers which can be copolymerized with the lactone modified acrylic monomer.

The vinyl based copolymer (A) in this present invention is obtained by copolymerizing these components, and this can be achieved using known methods of polymerization, such as solution polymerization, non-aqueous dispersion polymerization and bulk polymerization for example, as the method of polymerization, and solution polymerization is especially desirable.

In this case, the polymerization is carried out in such a way that the vinyl based copolymer obtained contains 5–60 percent by weight of structural units which can be represented by the general formula [1] and 40–95 percent by weight of structural units originating from the other monomer. If the content of structural units represented by general formula [1] is less than 5 percent by weight then the scratching resistance of the paint film becomes inadequate, and if it exceeds 60 percent by weight then the paint film hardness becomes inadequate, and the staining resistance falls, and this is undesirable.

Furthermore, the monomer composition is decided in such a way that the vinyl based copolymer (A) has a hydroxy group value of 60–200 mg KOH/gram. If the hydroxy group value is less than 60 mg KOH/gram then sufficient crosslinking points with the (B) component and the (C) component are not obtained, and this has an adverse effect on the solvent resistance of the paint film. On the other hand, if the hydroxy group value exceeds 200 mg KOH/gram then a hard and brittle paint film is obtained and the flex resistance becomes inadequate.

The method in which ε-caprolactone is subjected to ring opening polymerization in the presence of a catalyst on a vinyl based resin, such as acrylic polyol resin for example, as disclosed, for example, in Japanese Patent Kokai 48-66194, can also be used as another method for the manufacture of the vinyl based copolymer (A). In this case the ring opening polymerization is carried out in such a way that the hydroxy group value and the proportion of structural units of general formula [1] are within the aforementioned ranges.

Furthermore, it is desirable that the vinyl based copolymer (A) should have a weight average molecular weight of 4000–40000, a glass transition temperature of $-30°$–$+60°$ C., and an acid value of 0–40 mg KOH/gram. In those cases where the weight average molecular weight is below the abovementioned range, this has an adverse effect on the weather resistance of the paint film, and if it exceeds the abovementioned range then the appearance becomes poor. Furthermore if the glass transition temperature is below the abovementioned range then the hardness of the paint film becomes inadequate, and if it exceeds the abovementioned range then the scratching resistance falls. Moreover, the appearance becomes poor when the acid value exceeds the abovementioned range.

The blocked polyisocyanate which is used for the (B) component in a thermoset covering composition of this present invention is a material in which a polyisocyanate compound has been blocked by reacting beforehand with malonic acid ester and acetoacetic acid ester, and it is used with a view to improving the acid resistance and the scratching resistance.

Hexamethylene diisocyanate, trimethylhexamethylene diisocyanate, isophorone diisocyanate, hydrogenated diphenylmethane diisocyanate, and cyanurate derivatives such as hydrogenated xylylene diisocyanurate, biuret derivatives and non-yellowing type polyisocyanate compounds such as those of the adduct type are preferred for the polyisocyanate compound which is used for the blocked polyisocyanate compound (B).

Examples of the malonic acid esters which are prereacted as blocking agents for these polyisocyanate compounds include, for example, the malonic acid esters which have alkyl groups of carbon number 1–4, such as malonic acid dimethyl ester, malonic acid diethyl ester, malonic acid dipropyl ester, malonic acid diisopropyl ester, malonic acid dibutyl ester, malonic acid methyl ethyl ester, malonic acid methyl propyl ester, malonic acid methyl butyl ester, malonic acid ethyl propyl ester and malonic acid ethyl butyl ester.

Acetoacetic acid esters which have alkyl groups of carbon number 1–4, such as methyl acetoacetate, ethyl acetoacetate, propyl acetoacetate, isopropyl acetoacetate, butyl acetoacetate, isobutyl acetoacetate and t-butyl acetoacetate for example, can be cited for the acetoacetic acid ester which forms the other blocking agent.

The blocked polyisocyanate compound is obtained by reacting the polyisocyanate compound with a mixture of 5–95 mol. % malonic acid ester and 95-5 mol. % acetocetic acid ester until there are no free isocyanate groups remaining at all. If the amount of malonic acid ester is less than 5 mol. % and the amount of acetoacetic acid ester is in excess of 95 mol. % this has an adverse effect in the yellowing properties on baking and results in a worsening of the appearance of the paint film. On the other hand, of the amount of malonic acid ester exceeds 95 percent by weight and the amount of acetoacetic acid ester is less than 5 percent by weight then the compatibility with the vinyl based copolymer (A) is reduced, resulting in a worsening of the appearance, and both of these cases are undesirable.

The alkyl etherified amino resin which is used for the (C) component in a thermoset covering composition of this present invention is an amino resin which has been alkyl etherified, and it is compounded with a view to conformability with a wet on wet painting system.

The alkyl etherified amino resin (C) can be manufactured by methylolating an amino resin, such as a melamine, benzoguanamine, glycolyl, cyclohexylguanamine or urea resin for example, and then etherifying the product with an alkanol of carbon number 1–6 or cyclohexanol. Butyl etherified melamine resin, methyl etherified melamine resin, and butyl and methyl mixed etherified melamine resin, for example, can be cited as alkyl etherified amino resins of this type. Furthermore, commercial alkyl etherified amino resins such as Saimeru and Maikooto made by Mitsui Cyanamid (Co.), Yuuban made by Mitsui Toatsu Kagaku (Co.) and Suupaabekkamin made by Dainippon Ink Kagaku Kogyo (Co.) (all of these are trade names), for example, can also be used.

The thermoset covering compositions of this present invention contain, as mentioned above, 40–80 percent by weight of the vinyl based copolymer (A), 10–40 percent by weight of the blocked polyisocyanate compound (B) and 5–30 percent by weight of the alkyl etherified amino resin (C).

In those cases where the vinyl based copolymer (A) content is less than 40 percent by weight the improvements in scratching resistance and flexibility are inadequate, and when it exceeds 60 percent by weight the crosslink density of the hardened paint film is reduced and the water resistance and solvent resistance are inadequate.

Furthermore, in those cases where the 20 polyisocyanate compound (B) content is less than 10 percent by weight the acid resistance is inadequate, and when it exceeds 40 percent by weight the yellowing on baking properties and appearance become poor.

Moreover, when the alkyl etherified amino resin (C) content is less than 5 percent by weight the appearance becomes poor when the base coat paint and the clear coat paint are painted on one another with a wet on wet system and heated and hardened at the same time, and if it exceeds 30 percent by weight the acid resistance falls.

The thermoset covering compositions of this present invention can be mixed in the usual way by compounding the components (A)–(C) in the proportions indicated above using the usual means for mixing paints.

The thermoset covering compositions of the present invention obtained in this way can be used as top-coat paints, and in this case they may take the form of a clear coat paint or that of a colored paint which contains pigment. The compositions of this present invention can also be compounded with organic solvents, pigments and other paint additives for example, as required, in addition to the components (A)–(C).

Hydrocarbon based solvents such as hexane, heptane, octane, toluene and xylene; alcohol based solvents such as methyl alcohol, ethanol, isopropanol, butanol, amyl alcohol, 2-ethylhexyl alcohol and cyclohexanol; ether based solvents such as hexyl ether, dioxane, ethylene glycol mono-methyl ether, ethylene glycol mono-ethyl ether, ethylene glycol mono-butyl ether, ethylene glycol di-ethyl ether and diethylene glycol mono-butyl ether; ketone based solvents such as methyl ethyl ketone, methyl isobutyl ketone, cyclohexanone and isophorone; ester based solvents such as ethyl acetate, butyl acetate, amyl acetate, ethylene glycol mono methyl ether acetate and diethylene glycol mono-ethyl ether acetate; and aromatic petroleum derivatives such as Sorubesso #1000 and Sorubesso #1500 (made by the Shell Chemical Co.) for example can be used for the organic solvent, and they should be solvents in which the composition of this present invention can be dissolved or dispersed.

Other paint additives include, for example, paint surface adjusting agents, viscosity adjusting agents, ultraviolet absorbers, light stabilizers and hardening catalysts for example.

Moreover, metallic pigments, such as aluminum powder or mica powder, and colored pigments, can be cited as pigments.

In those cases where the thermoset covering compositions of this present invention are used as clear coat top coat paints, the surface of the object which is to be painted is painted with primer and painted with an under-coat paint by electrodeposition painting for example, and then intermediate coat painting is carried out, as required, and then the paint for the top coat base coat is painted on and the thermoset covering composition of this present invention is painted over this. In this case, the resin composition of this present invention may be painted after hardening the top coat base coat paint film, but it is preferably used in a two-coat one-bake system where the resin composition of this present invention is painted over the top without hardening the top coat base coat paint film or with this paint film in a semi-hardened condition, and then baked at the same time as the base coat paint film.

The baking conditions preferably involve heating for a period of 10–60 minutes to 80°–180° C.

Examples of objects to be painted include metal surfaces, such as sheets of iron, steel, aluminum, zinc, alloys of these materials and surface treated sheets where these metals sheets have been subjected to iron phosphate treatment, zinc phosphate treatment or chromate treatment for example, plastic surfaces, such as polyurethane, polypropylene and polycarbonate surfaces for example, and timber surfaces.

The materials generally used on metal, plastic or timber surfaces can be used as the primer paints, electro-deposition paints and intermediate coat paints for example, and as the top coat base coat paints.

Paints of this type include paints which contain nitrocellulose modified acrylic lacquers, cellulose acetate butyrate modified acrylic lacquers, acrylic urethanes and polyester urethanes, and paints in which amino acrylic based resins, amino alkyd based resins and amino polyester based resins, for example, form the main vehicle component.

No particular limitation is imposed upon the form of the paint, and it can be used in any paint form, such as an organic solvent type, non-aqueous dispersion type, aqueous solution type aqueous dispersion type, powder paint or a high-solid type, for example.

EFFECT OF THE INVENTION

A thermoset covering composition of this present invention contains the aforementioned components (A)–(C) and so paint films which have excellent acid resistance and scratching resistance can be obtained and, moreover, even when two-coat one-bake painting is used, a paint film of satisfactory appearance is obtained, a poor appearance caused by yellowing during baking or incompatibility being prevented.

ILLUSTRATIVE EXAMPLES

The invention is described below in more detail by means of illustrative examples and comparative examples. Moreover, when there is no indication to the contrary, "parts" and "%" signify "parts by weight" and "percent by weight" respectively.

PREPARATION OF A BASE COAT PAINT

Styrene (150 parts by weight), 280 parts by weight of methyl methacrylate, 400 parts by weight of butyl methacrylate, 150 parts by weight of 2-hydroxyethyl methacrylate and 20 parts by weight of acrylic acid were copolymerized in xylene, using azobisisobutyronitrile as polymerization initiator, and an acrylic resin solution of residue on heating 50 wt.% was obtained. The weight average molecular weight according to gel permeation chromatography (calculated as polystyrene) was 32000. A base coat paint was prepared with the composition shown in Table 1 using this acrylic resin solution.

TABLE 1

| Name of Ingredient | | Amount Compounded (parts by weight) |
|---|---|---|
| Acrylic resin solution | | 140 |
| Amino resin solution | *1 | 50 |
| CAB resin solution | *2 | 25 |
| Titanium oxide | *3 | 100 |
| Ultraviolet absorber | *4 | 10 |
| Light stabilizer | *5 | 5 |
| Leveling agent solution | *6 | 3 |

Notes for Table 1
1 Trade name Yuuban 20SE (butylated melamine resin), made by Mitsui Toatsu Kagaku (Co.)
2 A 20 wt. % butyl acetate solution of CAB381-2 (trade name, cellulose acetate butyrate resin) made by the Eastman Co.
3 Trade name JR602, made by Teikoku Kako (Co.)
4 A 10 wt. % xylene solution of Tinuvin 900 (trade name), made by the Ciba Geigy Co.
5 A 20 wt. % xylene solution of Sanooru LS292 (trade name), made by Mitsui (Co.)
6 A 20 wt. % xylene solution of Modaflow (trade name), made by the Monsanto Co.

Next, this base coat paint was diluted using a thinner comprising 50 parts by weight of toluene, 30 parts by weight of butyl acetate and 20 parts by weight of isobutyl alcohol so as to establish a viscosity of 13 seconds (20° C.) with a Ford Cup No.4.

PREPARATION OF VINYL BASED POLYMERS

Example of Manufacture 1

A reactor was fitted with a thermometer, a thermostat, a stirrer, a reflux condenser and a dropping funnel and 30 parts of xylene and 25 parts of n-butanol were then introduced into the reactor and the temperature was raised to, and maintained at, 115° C., with stirring, and a mixture of 20 parts [sic] of polymerization initiator and 100 parts of monomer as shown in Table 2 was added dropwise at a constant rate over a period of 2 hours using the dropping funnel. After the drip feed had been completed, the temperature was maintained at 115° C. for 1 hour and the stirring was continued, and then 0.2 parts of additional catalyst t-butylperoxy 2-ethylhexanoate were added. Then, after the addition, the temperature was maintained at 115° C. for 1 hour and the reaction was completed.

The hydroxy group containing vinyl based copolymer solution Al so obtained was a clear solution with a uniform Gardener viscosity U of involatile fraction 60%. Furthermore, the weight average molecular weight of the copolymer was 20000 and the hydroxy group value was 80.

Examples of Manufacture 2–8

The vinyl based copolymer solutions A2–A8 were obtained using the same procedure as in Example of Manufacture 1 except that the mixtures of monomers and polymerization initiator and the additional catalysts shown in Table 2 were used. The property values of the copolymer solutions obtained and the copolymers are shown in Table 2.

TABLE 2

| Vinyl Copolymer Solution | | A1 | A2 | A3 | A4 | A5 | A6 | A7 | A8 |
|---|---|---|---|---|---|---|---|---|---|
| <1 | Purakuseru FM-1*1 | | 43,5 | | 21,7 | | | | |
| | Purakuseru FM-2*2 | 51,0 | | 12,7 | | 6,4 | 31,9 | | 51 |
| | 2-Hydroxyethyl methacrylate | | | 27,8 | 25,5 | 39,4 | 16,2 | 32,4 | |
| | n-Butyl methacrylate | 28,9 | 25,4 | 44,2 | 8,6 | 7,2 | 26,4 | 26,2 | 36,9 |
| | Ethyl methacrylate | | | | 42,9 | 45,7 | 14,2 | | |
| | 2-Ethylhexyl methacrylate | 10,0 | 28,5 | 11,4 | | | 10,0 | 37,5 | |
| | 2-Ethylhexyl acrylate | 8,8 | | | | | | | 10,8 |
| | Acrylic acid | 1,3 | 2,6 | 3,9 | 1,3 | 1,3 | 1,3 | 3,9 | 1,3 |
| | t-Butylperoxy 2-ethylhexanoate | 2,0 | 2,5 | 3,0 | 3,0 | 3,3 | 3,0 | 3,0 | 2,0 |
| | Add. t-Butylperoxy 2-ethylhexanoate, (parts) | 0,2 | 0,2 | 0,2 | 0,2 | 0,2 | 0,2 | 0,2 | 0,2 |
| <2 | Glass Transition Temperature (°C.)*3 | −20 | 0 | 20 | 40 | −50 | 10 | 20 | −20 |
| | Hydroxy Group Values (mg KOH/g) | 80 | 100 | 140 | 160 | 180 | 120 | 140 | 80 |
| | Acid Value (mg KOH/g) | 10 | 20 | 30 | 10 | 10 | 10 | 30 | 10 |
| | Weight Average Molecular Weight*4 | 20000 | 15000 | 10000 | 8000 | 6000 | 10000 | 10000 | 20000 |
| <3 | Involatile Fraction (% by weight) | 60 | 60 | 60 | 60 | 60 | 60 | 60 | 60 |

KEY <1>: Monomers and Polymerization Initiator (parts)
<2>: Property Values of the Vinyl Based Copolymer
<3>: Property Values of the Vinyl Based Copolymer Solution Notes for Table 2
*1,*2 Purakuseru FM-1 and FM2 (made by Daiseru Kagaku (Co.)) are monomers in which 1 mol or 2 mol respectively of ε-caprolactone has been added to 1 mol of 2-hydroxyethyl methacrylate.
*3 Calculated using the Fox equation.
*4 Measured by gel permeation chromatography (calculated as polystyrene).

EXAMPLES 1–6 AND COMPARATIVE EXAMPLES 1–5

Clear paints were prepared with the formulations shown in Table 3 and Table 4 using the copolymer solutions obtained in Examples of Manufacture 1–8.

TABLE 3

| Parts, with the solid fraction (%) in brackets | | Example 1 | 2 | 3 | 4 | 5 | 6 |
|---|---|---|---|---|---|---|---|
| (A) Component | Vinyl based copolymer solution | A1 116.7 (70) | A2 100.0 (60) | A3 108.3 (65) | A4 108.3 (65) | A5 83.3 (50) | A6 100.0 (60) |
| (B) Component | HDI-1 #1 | 16.7 (10) | | | | | |
| | HDI-2 #2 | | 33.3 (20) | | 33.3 (20) | 33.3 (20) | 16.7 (10) |
| | HDI-3 #3 | | | 25.0 (15) | | | |
| | HDI-4 #4 | | | | | | |
| | HDI-5 #5 | | | | | | |
| | IPDI-1 #6 | 8.3 (5) | | | | 16.7 (10) | 16.7 (10) |
| | IPDI-2 #7 | | | | | | |
| (C) Component | Saimeru 327 #8 | 16.7 (15) | | | 16.7 (15) | | |
| | Kooban 20HS #9 | | 28.6 (20) | | | 28.6 (20) | |
| | Maikooto 508 #10 | | | 25.0 (20) | | | 25.0 (20) |
| Additives | Tinuvin 900 (10% xylene) #11 | 10.0 | 10.0 | 10.0 | 10.0 | 10.0 | 10.0 |
| | Sanooru LS292 (10% xylene) #12 | 10.0 | 10.0 | 10.0 | 10.0 | 10.0 | 10.0 |
| | Modaflow #13 | 0.1 | 0.1 | 0.1 | 0.1 | 0.1 | 0.1 |

TABLE 4

| Parts, with the solid fraction (%) in brackets | | Comparative Example 1 | 2 | 3 | 4 | 5 |
|---|---|---|---|---|---|---|
| (A) Component | Vinyl based copolymer solution | A7 108.3 (65) | A4 100.0 (60) | A4 100.0 (60) | A8 116.7 (70) | A8 116.7 (70) |
| (B) Component | HDI-1 #1 | | | | | |
| | HDI-2 #2 | | | | | |
| | HDI-3 #3 | 25.0 (15) | | | | |
| | HDI-4 #4 | | 33.3 (20) | | | |
| | HDI-5 #5 | | | 33.3 (20) | | |
| | IPDI-1 #6 | | | | | |
| | IPDI-2 #7 | | | | 8.3 (5) | 50.0 (30) |
| (C) Component | Saimeru 327 #8 | | | | 27.8 (25) | |
| | Kooban 20HS #9 | | 28.6 (20) | 28.6 (20) | | |
| | Maikooto 508 #10 | 25.0 (20) | | | | |
| Additives | Tinuvin 900 (10% xylene) #11 | 10.0 | 10.0 | 10.0 | 10.0 | 10.0 |
| | Sanooru LS292 (10% xylene) #12 | 10.0 | 10.0 | 10.0 | 10.0 | 10.0 |
| | Modaflow #13 | 0.1 | 0.1 | 0.1 | 0.1 | 0.1 |

Notes for Table 3 and Table 4

*1–*3 Blocked polyisocyanates (effective fraction 60%) obtained by reacting the isocyanate groups of the isocyanurate trimer of hexamethylene diisocyanate with diethyl malonate, ethyl acetoacetate, or a mixture of the two in the proportions shown in Table 5, until the free isocyanate groups had been completely eliminated.

TABLE 5

| | Diethyl malonate (mol. %) | Ethyl acetoacetate (mol. %) |
|---|---|---|
| HDI-1 | 67 | 33 |
| HDI-2 | 50 | 50 |
| HDI-3 | 80 | 20 |
| HDI-4 | 100 | 0 |
| HDI-5 | 0 | 100 |

*6–*7 Blocked polyisocyanates (effective fraction 60%) obtained by reacting the isocyanate groups of the isocyanurate trimer of isophorone diisocyanate with diethyl malonate, ethyl acetoacetate, or a mixture of the two in the proportions shown in Table 6, until the free isocyanate groups had been completely eliminated.

TABLE 6

| | Diethyl malonate (mol. %) | Ethyl acetoacetate (mol. %) |
|---|---|---|
| IPDI-1 | 33 | 67 |
| IPDI-2 | 50 | 50 |

*8 Imino group type methylated melamine resin, involatile fraction 90%, made by Mitsui Cyanamid (Co.)

*9 n-Butylated melamine resin, involatile fraction 70%, made by Mitsui Toatsu Kagaku (Co.)

*10 Imino group type butylated melamine resin, involatile fraction 80%, made by Mitsui Cyanamid (Co.).

*11 Ultraviolet absorber, made by the Ciba Geigy Co.

*12 Light stabilizer, made by Mitsui (Co.)

*13: Leveling agent, made by the Monsanto Co.

Next, the clear coat paints of Table 3 and Table 4 were adjusted in terms of viscosity to 25 seconds (Ford cup #4/20° C.) with a thinner of composition Sorubesso #150/n-butanol=90 parts by weight/10 parts by weight.

Next, Akua No. 4200 (trade name, electro-deposition paint, made by Nippon Yushi (Co.)) was painted onto a zinc phosphate treated steel sheet so as to provide a dry film thickness of 20 m and, after hardening at 175° C. for 20 minutes, Haiepiko No. 100 White (trade name, intermediate coat paint, made by Nippon Yushi(Co.)) was pained on so as to provide a dry film thickness of 40 m and hardened at 140° C. for 20 minutes.

The base coat paint of Table 1 was painted over this paint film with an air sprayer in such a way as to provide a dry film thickness of 15 m and then, after drying for 3 minutes at room temperature, each of the paint solutions shown in Table 3 and Table 4 was painted on respectively with an air sprayer, and test specimens were obtained by heating to 140° C. for 20 minutes and hardening. Moreover, for the scratching resistance tests, the clear coat paints were painted directly onto Haiepiko No.100 Black (trade name, intermediate coat paint, made by Nippon Yushi (Co.)) and test specimens were obtained by heating and hardening.

The paint film performances of the test specimens obtained were investigated. The results obtained are shown in Table 7.

TABLE 7

|  | Example | | | | | | Comparative Example | | | | |
| --- | --- | --- | --- | --- | --- | --- | --- | --- | --- | --- | --- |
|  | 1 | 2 | 3 | 4 | 5 | 6 | 1 | 2 | 3 | 4 | 5 |
| Appearance PGD Value | 1.0 | 1.0 | 1.0 | 1.0 | 1.0 | 1.0 | 1.0 | Turbi | 1.0 | 1.0 | 0.7 |
| Scratching Resistance | ◯ | ◯ | ◯ | ◯ | ◯ | ◯ | X | ◯ | ◯ | ◯ | ◯ |
| Acid Resistance | ◯ | ◯ | ◯ | ◯ | ◯ | ◯ | ◯ | ◯ | ◯ | X | ◯ |
| Pencil Hardness | HB | F | F | H | 2H | F | F | F | F | HB | HB |
| Xylene Rubbing | ◯ | ◯ | ◯ | ◯ | ◯ | ◯ | ◯ | ◯ | ◯ | ◯ | ◯ |
| Moisture Resistance | ◯ | ◯ | ◯ | ◯ | ◯ | ◯ | ◯ | ◯ | ◯ | ◯ | ◯ |
| Accelerated Weathering Properties | ◯ | ◯ | ◯ | ◯ | ◯ | ◯ | ◯ | ◯ | ◯ | ◯ | ◯ |
| Yellowing | ◯ | ◯ | ◯ | ◯ | ◯ | ◯ | ◯ | ◯ | X | ◯ | ◯ |

Notes for Table 7

*1 Appearance: Measured using a portable clear gloss meter PGD IV [made by the Tokyo Koden (Co.)].

*2 Scratching Resistance: Muddy water (JIS Z-8901-84, a mixture of dust type 8/water/automobile window washer liquid=1/10/2 as a ratio by weight) was coated with a brush onto the test sheet and then the test sheet was subjected to 10 seconds rotation at 150 rpm of a car washing brush in an automatic car wash and then rinsed with water and cleaned. This operation was repeated twice and then the extent of scratching on the test sheet surface was measured in terms of the L* value using a color difference meter [CR-331 made by Minolta Camera (Co.)]. The ΔL* value was calculated using the following formula and the scratching resistance was evaluated with this value.

ΔL*=L* value after test–L* value before test

◯: Δ* is less than 3.0.

Δ: ΔL* is 3 or more but less than 5.

X: ΔL* is 5 or more.

*3 Acid Resistance: 40 wt. % aqueous sulfuric acid solution was applied as a 0.2 ml spot to the test sheet and rinsed off with water after being heated to 60° C. for 15 minutes, and the spot was then assessed visually.

◯: No anomaly.

X: A water mark was present.

*4 Pencil Hardness: The test sheet was subjected to pencil scratch tests in accordance with JIS K5400 ((1992) 8.4.2) in a constant temperature and constant humidity room at 20° C., 75% RH.

*5 Xylene Rubbing: The test sheet was fixed on a flat surface, a gauze which had been folded into 4 (3 cm×3 cm) was soaked with about 5 cc of xylene and then rubbed back and forth five times with a load of 500 g/9 cm². After this, the gauze was removed and the state of the surface was examined after wiping off the xylene with another gauze.

◯: No anomaly.

X: A fall in surface gloss and lightening occurred.

*6 Moisture Resistance: The specimen was left for 120 hours in a sealed container at a temperature of 50±1° C. and relative humidity at least 98% and any 20 swelling was observed, and an evaluation was made on the basis of the standards indicated below (JIS K5400 (1990) 9.2.2 Rotating System).

Good: No marked change was seen in the paint film.

Δ Poor: Swelling (diameter at least 0.2 mm) seen in the paint film

X Very Poor: Many swellings (diameter at least 0.2 mm) (3/cm) seen in the paint film

*7 Accelerated Weathering Properties: The samples were exposed for 3000 hours with a sunshine carbon arc lamp system (JIS K-5400 (1990) 9.8.1) and then they were examined visually in terms of gloss, change in color and spotting.

◯: Painted surface virtually unchanged.

X: Water marks and color changes seen at the paint surface and a marked fall in gloss.

*8 Yellowing: The clear coat paint was painted to a fixed film thickness (40 μm) onto a base coat paint with a wet on wet system and then it was baked for 1 hour at 160° C. and the state of yellowing of the paint film was observed.

◯: Virtually no change to be seen in the paint film.

X: Marked yellowing of the paint film.

As is clear from the results in Table 7, a clear coat paint in which a composition of this present invention is used provides a paint film which has excellent performance in terms of appearance, scratching resistance, acid resistance, hardness, xylene rubbing properties, moisture resistance, weather resistance and yellowing for example.

On the other hand, Comparative Example 1 has poor scratching resistance because the component (A) represented in general formula [1] is not included in the vinyl based copolymer. In Comparative Example 2, no ethyl acetoacetate is included among the active methylene groups which form the blocking agent for the isocyanate in the (B) component, diethyl malonate alone being used in this case, and so the compatibility in the clear coat paint was poor and this resulted in a poor appearance. On the other hand, in Comparative Example 3, only ethyl acetoacetate was used and so yellowing failure occurred on baking and hardening the clear coat paint. In Comparative Example 4, less than 10 percent by weight of the (B) component was included and so the acid resistance was poor. In Comparative Example 5 no alkyl etherified amino resin which is the (C) component was included in the clear coat paint and so the appearance was poor when it was painted on with the base coat paint using a wet on wet system and heated and hardened at the same time.

We claim:

1. The thermoset covering composition, comprising:

(A) 40–80 percent by weight of a copolymer in which the structural units represented by general formula [1] account for 5–60 percent by weight of the copolymer, and which has a hydroxy group value of 60–200 mg KOH/gram, (B) 10–40 percent by weight of blocked polyisocyanate compound formed by reacting a polyisocyanate compound with malonic acid ester and acetoacetic acid ester, and (C) 5–30 percent by weight of alkyl etherified amino resin, and wherein the general formula [1] is:

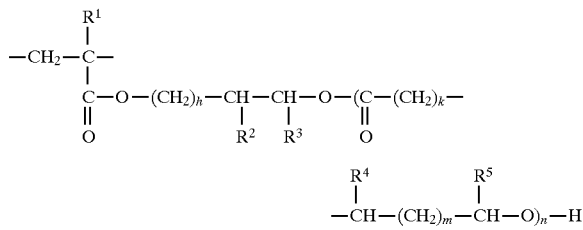

wherein $R^1$, $R^2$, $R^3$ and $R^4$ represent hydrogen atoms or methyl groups, $R^5$ represents a hydrogen atom or an alkyl group having 1–3 carbons, h is an integer of value 0–2, k is an integer of value 0–3, m is an integer of value 0–3 and n is an integer of value 1–5, and the sum of k and m is not more than 3.

2. The thermoset covering composition, of claim 1, wherein the copolymer (A) has a weight average molecular weight of 4000–40000, a glass transition temperature of −30–+60° C., and an acid value of 0–40 mg KOH/gram.

3. The thermoset covering composition, of claim 1, wherein, the blocked polyisocyanate compound (B) is formed by reacting a polyisocyanate compound with, 5–95 mol. % of malonic acid ester and 95 - 5 mol. % of acetoacetic acid ester.

4. The thermoset covering composition of claim 1, wherein, the blocked polyisocyanate compound (B) is formed from a polyisocyanate compound selected from the group consisting of aliphatic polyisocyanates, alicyclic polyisocyanates and mixtures thereof.

5. The thermoset covering composition, of claim 1 wherein the alkyl etherified amino resin (C) is a melamine resin which has been etherified with alkyl groups having a carbon chain length of from 1 to 6 carbons.

6. A thermoset covering composition, comprising:
(A) 40–80 percent by weight of a copolymer in which the structural units represented by general formula [1] account for 5–60 percent by weight of the copolymer, and which has a hydroxy group value of 60–200 mg KOH/gram,
(B) 10–40 percent by weight of blocked polyisocyanate compound formed by reacting a polyisocyanate compound with 5–95 mol % malonic acid ester and 95 - 5 mol % acetoacetic acid ester, and
(C) 5–30 percent by weight of alkyl etherified amino resin, and wherein the general formula is

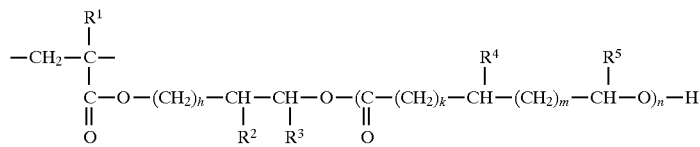

wherein $R^1$, $R^2$, $R^3$ and $R^4$ represent hydrogen atoms or methyl groups, $R^5$ represents a hydrogen atom or an alkyl group having 1–3 carbons, h is an integer of value 0–2, k is an integer of value 0–3, m is an integer of value 0–3 and n is an integer of value 1–5, and the sum of k and m is not more than 3, and all percents by weight are based on the weight of (A)+(B)+(C).

* * * * *